(12) United States Patent
Eriksson et al.

(10) Patent No.: US 12,482,092 B2
(45) Date of Patent: Nov. 25, 2025

(54) QUALITY INSPECTION METHOD AND QUALITY INSPECTION ARRANGEMENT

(71) Applicant: Siemens Aktiengesellschaft, Munich (DE)

(72) Inventors: Jonas Eriksson, Finspong (SE); Andreas Graichen, Norrköping (SE); Clemens Otte, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 302 days.

(21) Appl. No.: 18/022,365

(22) PCT Filed: Aug. 24, 2021

(86) PCT No.: PCT/EP2021/073312
§ 371 (c)(1),
(2) Date: Feb. 21, 2023

(87) PCT Pub. No.: WO2022/043283
PCT Pub. Date: Mar. 3, 2022

(65) Prior Publication Data
US 2023/0360194 A1  Nov. 9, 2023

(30) Foreign Application Priority Data
Aug. 26, 2020  (EP) .................................. 20192906

(51) Int. Cl.
*G06T 7/00* (2017.01)
*B33Y 40/00* (2020.01)
*B33Y 50/02* (2015.01)

(52) U.S. Cl.
CPC ............. *G06T 7/001* (2013.01); *B33Y 40/00* (2014.12); *B33Y 50/02* (2014.12); *G06T 2207/20021* (2013.01); *G06T 2207/30144* (2013.01)

(58) Field of Classification Search
USPC ........................................ 382/112
See application file for complete search history.

(56) References Cited

U.S. PATENT DOCUMENTS

| | | | |
|---|---|---|---|
| 9,390,494 B2 | 7/2016 | Hess | |
| 10,695,865 B2 * | 6/2020 | Graham | B23K 26/0006 |
| 2015/0045928 A1 | 2/2015 | Perez | |
| 2015/0078627 A1 | 3/2015 | Fukase | |
| 2016/0046077 A1 | 2/2016 | Yadroitsau | |

(Continued)

FOREIGN PATENT DOCUMENTS

| | | |
|---|---|---|
| DE | 102019102484 A1 | 8/2020 |
| EP | 3459715 A1 | 3/2019 |

(Continued)

OTHER PUBLICATIONS

Scime, Luke et al.: "Anomaly detection and classification in a laser powder bed additive manufacturing process using a trained computer vision algorithm. Additive Manufacturing"; 2018, 19. Jg., pp. 114-126. Available online: Nov. 16, 2017; 2018.

(Continued)

*Primary Examiner* — Darryl V Dottin
(74) *Attorney, Agent, or Firm* — Schmeiser, Olsen & Watts, LLP

(57) ABSTRACT

A quality inspection method and a quality inspection arrangement for 3D printing is provided.

13 Claims, 6 Drawing Sheets

(56) References Cited

U.S. PATENT DOCUMENTS

| | | | |
|---|---|---|---|
| 2016/0166333 A1* | 6/2016 | Wang | A61B 34/10 |
| | | | 600/476 |
| 2018/0322621 A1 | 11/2018 | Craeghs | |
| 2020/0171747 A1* | 6/2020 | Poullos | B29C 64/286 |
| 2021/0358101 A1 | 11/2021 | Neumann | |

FOREIGN PATENT DOCUMENTS

| WO | WO 2015020939 A1 | 2/2015 |
|---|---|---|
| WO | WO 2020157249 A1 | 8/2020 |

OTHER PUBLICATIONS

PCT International Search Report of International Searching Authority mailed 26.06.2022 corresponding to PCT International Application No. PCT/EP2021/073312 filed Aug. 24, 2021.

* cited by examiner

QUALITY INSPECTION METHOD AND QUALITY INSPECTION ARRANGEMENT

CROSS-REFERENCE TO RELATED APPLICATIONS

This application claims priority to PCT Application No. PCT/EP2021/073312, having a filing date of Aug. 24, 2021, which claims priority to EP Application No. 20192906.4, having a filing date of Aug. 26, 2020, the entire contents both of which are hereby incorporated by reference.

FIELD OF TECHNOLOGY

The following relates to a quality inspection method and quality inspection arrangement.

BACKGROUND

It is known that "additive manufacturing machines", so-called "3D printers", normally use cameras to monitor the layer-by-layer printing process. This is performed in particular in the field of metal printing, for example when using what is known as "selective laser melting" or what is known as sand printing, such as for example what is known as "binder jetting".

This normally involves monitoring the quality of the respective new coating conventionally by way of a powder bed camera, which is used to identify missing or inhomogeneous powder dispersion.

There are many approaches that attempt to identify defects on the basis of single images, which are typically taken after a new coating. The following two references are good examples of this approach:

Luke Scime, Jack Beuth, Anomaly detection and classification in a laser powder bed additive manufacturing process using a trained computer vision algorithm, Additive Manufacturing, Volume 19, 2018, Pages 114-126, ISSN 2214-8604.

EP 3 459 715 A1, which relates to a prediction of recoating problems in the laser powder bed melt.

These solutions work because in many cases a defect is clearly identifiable on the basis of a single image of the respective layer. Their reliability has limits, however, because there are also cases in which the defect is much more difficult to identify on the basis of a single image and they provide no or false error detections.

An improvement in this regard is attempted by WO 2015/020939 A1, which uses a comparison between a camera image and a rendering for detection. The rendering is produced here by what is known as a "slicer" from a CAD model.

Even the use of a rendering continues to have disadvantages with the mere use of single images, since the rendering merely provides an "abstract" representation that cannot satisfactorily eliminate the disadvantages of the more difficult flaw detection on the basis of a single image, among other things because the rendering has no information about the grayscale patterns observed in the real image.

This detection problem becomes even worse if thin or delicate structures are printed in the respective layer, because the missing powder is then visible only with a small number of pixels. This arises in particular against the background that the spatial resolution of powder bed cameras is often very limited.

US 2018/322621 A1 discloses prediction of the parts and material quality of additive manufacturing (AM) processes by using layer-based images. It describes methods and systems for detecting flaws in parts during AM processes such as selective laser melting. The detection comprises analyzing optical images to identify flaws that occur in the layers during the AM manufacturing process.

SUMMARY

An aspect relates to the quality inspection method and by the arrangement for quality inspection by the characterizing features in each case.

The invention's quality inspection method for three-dimensional printing, for example using the so-called "additive manufacturing" method, wherein a three-dimensional printing object is produced in such a way that the printing object is divided virtually into layers and successive layers of the print model are gradually printed by the printer in such a way that a. this is accomplished by virtue of a new coating with a powder being provided for each layer according to the virtual layer that is to be printed,
b. the new coating is fixed, in particular using a laser, adhesive or electron beam, involves, for each layer,
c. at least one first digital snapshot of the fixed layer being produced,
d. at least one second digital snapshot of the new coating being produced,
e. at least one virtual split for the first snapshot and at least one virtual split for the second snapshot being provided in such a way that the first snapshot and the second snapshot are each divided into subareas in such a way that all of the subareas cover the whole snapshot at least once per snapshot, and the first split being provided in such a way that a subarea of the first snapshot corresponds to a subarea of the second snapshot in terms of position and dimension and the sum of the subareas of the first snapshot corresponds to the sum of the subareas of the second snapshot,
f. a subarea of the first snapshot that is determined by identical position and identical dimension and a subarea of the second snapshot that is determined by the identical position and identical dimension being taken as a basis for performing an examination in such a way that the subareas are subjected to a, in particular machine-learning-assisted, correlation and aggregation,
g. the correlation and aggregation being repeated at least for each pair of subareas of the first snapshot and of the second snapshot that is defined by identical position and identical dimension, the position of each further pair of subareas being shifted gradually in the x and/or y direction according to a Cartesian coordinate system,
h. an error procedure being initiated if a defect at least on the current layer is signaled on the basis of at least one performed correlation and/or aggregation.

The dimension, which is generally defined as the extent of bodies, is defined here within the context of this disclosure as denoting the size of the subarea that is spanned for example by a first number of pixels in the x direction and a second number of pixels in the y direction according to a Cartesian coordinate system.

The method according to embodiments of the invention thus sets itself apart from a mere pixel-by-pixel comparison of images because areas formed by the subareas are used for the examination. This means that for example brightness differences, which distort the grayscale values of the photographed materials, do not cause incorrect examination results, or cause them to a much lesser extent. This is further enhanced by embodiments of the invention's approach of pairs of areas of the photograph of the powder-coated layer and of the photograph of the layer fixed in particular by laser exposure, electron irradiation or adhesive bonding, because, based on inventive considerations, there are relationships between these layers that can be identified with the examination according to embodiments of the invention on the basis of correlation and thus almost eliminate distortions by external influences, among other things. Based on inventive thought, this results in the image before the coating being compared with the image after the coating, so that missing powder can be identified during this before/after comparison basically from the fact that the two images show locally similar content. Since, according to embodiments of the invention, not only the correlation but also an aggregation is performed, however, this is enhanced and also becomes more accurate. This is achieved because, according to embodiments of the invention, adjacent subareas of the photographs of the fixed and newly coated layer are likewise routed to the correlation. Based on inventive considerations, adjacent subareas likewise have a relationship with one another that is identified by the correlation in conjunction with the aggregation in such a way that reliable indications of defects, such as missing powder, can be provided. These indications, that is to say the detection of flaws, are thus improved further, according to embodiments of the invention, by the fact that, according to embodiments of the invention, this means that not only the correlation but also an aggregation takes place. That is to say that the results of the correlations for each area are subjected to collective consideration in a suitable manner, and so the relationships between adjacent subareas are identified as flaw information.

In an embodiment's arrangement for quality inspection for three-dimensional printing, for example using the so-called "additive manufacturing" method, wherein a three-dimensional printing object is produced in such a way that the printing object is divided virtually into layers and successive layers of the print model are gradually printed by the printer in such a way that a. this is accomplished by virtue of a new coating with a powder being provided for each layer according to the virtual layer that is to be printed, b. the new coating is fixed, in particular using a laser, adhesive or electron beam, comprises means for carrying out the method according to embodiments of the invention.

This results in the advantage that an implementation of the method according to embodiments of the invention are provided, and so the arrangement also has, among other things, the advantages specified for the method according to embodiments of the invention.

Further advantageous configurations and developments of embodiments of the invention are specified by the subclaims.

In one development of embodiments of the invention, the virtual split for the first snapshot and the virtual split for the second snapshot are provided in such a way that first subareas are formed, which have a first dimension, and second subareas are formed, which have a second dimension, the second dimension being larger than the first, a. the correlation is performed in such a way that a correlation coefficient is formed for each pair of first subareas that is situated within a pair of second subareas, the position of each further pair of subareas being shifted gradually in the x and/or y direction according to a Cartesian coordinate system, b. the aggregation is performed in such a way that the sum of the correlation coefficients is formed for each second subarea over all first pairs of first subareas that are positioned within the second subarea, c. at least a comparison of the sum with a first threshold value is taken as a basis for initiating the error procedure if the threshold value is exceeded.

The first dimension is defined here within the context of this disclosure as the size of the first subarea, which is provided for example by the area spanned by a number of pixels in the x and y directions, whereas second dimension is defined here within the context of this disclosure as the size of the second subarea, which is provided for example by the number of first subareas in the x direction and the number of first subareas in the y direction, that is to say a larger number of pixels in the x and y directions.

To a certain extent, the first subareas thus define cells that form a subset of second subareas, which can be regarded as blocks, since the second subareas are larger from the point of view of dimension, that is to say of the area under consideration. For the examination, the pairs of cells and the pairs of blocks are formed for the correlation and aggregation, the cells being shifted step by step within the blocks, because the blocks are larger, until the whole area to be examined, which corresponds to no more than the dimension of the block, for example, that is to say the area of the block, has contributed to the examination at least once. Since the split for the cells is a virtual split, the cells (first subarea) can also be shifted for example until the whole area of the photograph has thus been covered at least once by a cell for the purpose of examination, that is to say the whole area has contributed to the correlation, and then the split for the whole area of the photograph into blocks containing a specific number of cells can be performed in order to perform the aggregation. The new pairs formed by the shifting are thus also included in the examination. This split into blocks and cells also results in the blocks and cells, based on inventive thought, having relationships with one another that assist in the accurate detection of flaws by way of a suitable correlation and aggregation. In this regard, this development involves a coefficient being formed for each pair of first subarea and the coefficient then being summed in each case to produce the coefficient of the coefficient formed by the shifted first subarea (cells) within a block. This summation forms the aggregation and results in a total value, that is to say a collective consideration, that, if it exceeds a threshold value, is an indication of a flaw. The choice of threshold value is made here, according to embodiments of the invention, such that this signal is accurate.

In this regard, one development according to embodiments of the invention can here involve for example empirical values, parameters of the surroundings and/or an, in particular machine-learning-assisted, optimization procedure being used to set or optimize this value, before and/or during further operation.

According to one development of the method, the correlation coefficient is formed as a so-called Pearson correlation coefficient. This is particularly suitable for identifying the relationships and for aggregation.

Embodiments of the invention are developed here in such a way that the Pearson correlation coefficient is formed on the basis of the formula $$r(c^a, c^b) = \frac{\sum k(p_k^a - m^a)(p_k^b - m^b)}{\sqrt{\sum k(p_k^a - m^a)^2 \sum k(p_k^b - m^b)^2}}$$

with
a=first snapshot,
b=second snapshot,
ca=first subarea ("cell") of the first snapshot,
cb=first subarea ("cell") of the second snapshot,
pk=the individual pixel values of the respective first subarea,
m=the average pixel value of the respective first subarea,
k=running index for the pixel values pk of the respective first subarea
r ∈ [−1, 1] for each first subarea.

This defines one of the possible implementations of the inventive concept in an advantageous manner.

If, before the aggregation, the coefficient is normalized in such a way that if a second threshold value, in particular a value less than the value 0.9, is not reached then the coefficient is set to the value 0, then a threshold value, for example in the spirit of an optimum default value, is specified and therefore also assists the implementation of the method according to embodiments of the invention, or specifies a possible implementation for the threshold value.

If embodiments of the invention are developed in such a way that a ratio of the first dimension to the second dimension is stipulated in such a way that at least two first subareas overlap, then, based on inventive thought, the relationships between the pairs of first subareas, which are used for the examination, are further reinforced, since the adjacent new pairs of cells and/or blocks, that is to say those produced by the shifting of the position, are then no longer disjunct. Another advantage in this instance is, among other things, that the overlapping portions, that is to say areas, are subjected to the examination repeatedly. Locally occurring interfering influences, such as light reflections, that distort the respective photograph, in particular the grayscale level of the pixels, thus sometimes disappear for the next cell and can reveal a concealed flaw or avoid an incorrect error message, but at least, as a result of the collective overview, provide an indication, for example because individual values have a stronger or weaker effect during correlation and/or aggregation.

A further development that is advantageous for the implementation, or represents the implementation in the spirit of an optimized default value, is provided if the first dimension and the second dimension are defined by the number of pixels in the x and y directions according to a Cartesian coordinate system, and the ratio of the first dimension to the second dimension is stipulated in such a way that at least two first subareas have an overlap for at least one pixel row, in particular the first dimension is defined by 3×3 pixels and the second dimension is defined by 5 subareas×5 subareas, this ultimately also being a split according to pixels. Division according to pixels is useful in particular when considering a resolution of the digital camera that produces the snapshots, since the camera also relates to pixels and as such it is possible for optimum values, such as cell, block and/or threshold variables, to be ascertained as simply as possible. Moreover, the quality inspection thus becomes more finely granular. In particular 3×3 pixels for cells and 5×5 cells (subareas) for the blocks containing the cells results in an overlap between two pixel rows in the x direction during the shifting in the x direction in order to form subsequent "adjacent" cells (in quotation marks because the areas are then no longer disjunct, of course. The definition of "adjacent" within the context of this disclosure thus also includes non-disjunct cells) and two pixel rows in the y direction, and thus proves an advantageous choice, for example in the spirit of an optimum default value for an implementation, since a relatively large region overlaps with, among other things, the aforementioned advantage of compensating for locally occurring disruptions.

According to one development of embodiments of the invention, the ratio of the first dimension and second dimension defined by the number of pixels is stipulated in such optimized fashion that they take account of in particular the resolution of a camera that produces the first and second snapshots and/or other parameters relating to the three-dimensional print. The aforementioned optimization in view of the camera resolution is hereby applied specifically for the dimension ratio and thus contributes to the aforementioned advantages in this regard.

In a further development of embodiments of the invention, the examination is performed on the basis of subareas determined by at least a first pair comprising a first snapshot and a second snapshot and a second pair comprising a first snapshot and a second snapshot. As a result, embodiments of the invention's approach of making use of relationships is refined further still, since now not only pairs of cells and blocks of a current layer are considered, but also at least the pairs of a subsequent layer too, since these also have a relationship that can be used by embodiments of the invention's correlation and aggregation in order to identify signs of flaw. An advantage of this may be, among other things, that if the results of the aggregated values of the first pair and the second pair are summed, the value of the sum can be an indication of the degree of the flaw. That is to say that for example a very high value can indicate a serious defect, and vice versa.

BRIEF DESCRIPTION

Some of the embodiments will be described in detail, with reference to the following figures, wherein like designations denote like members, wherein.

Figure 4:
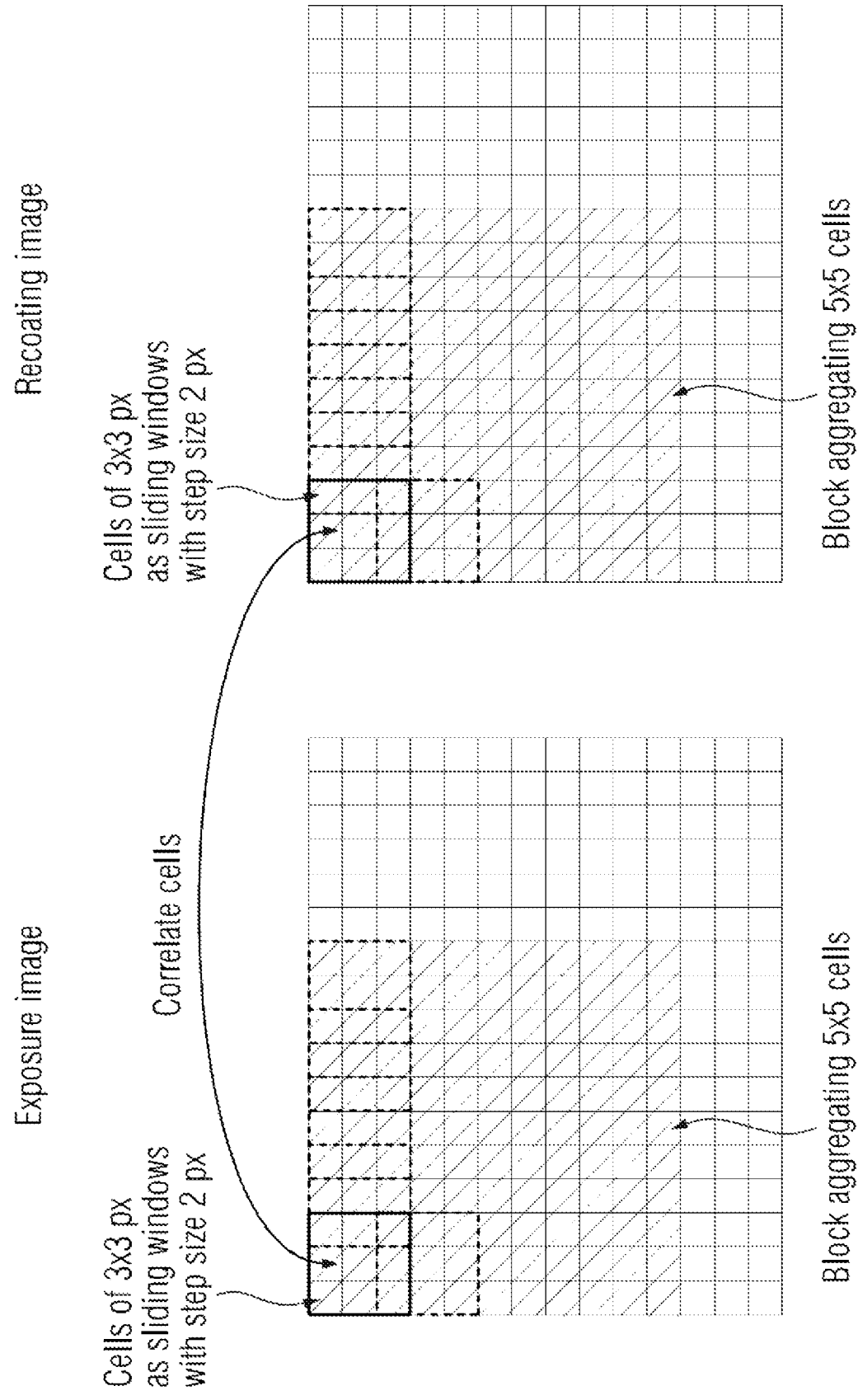
Figure 5:
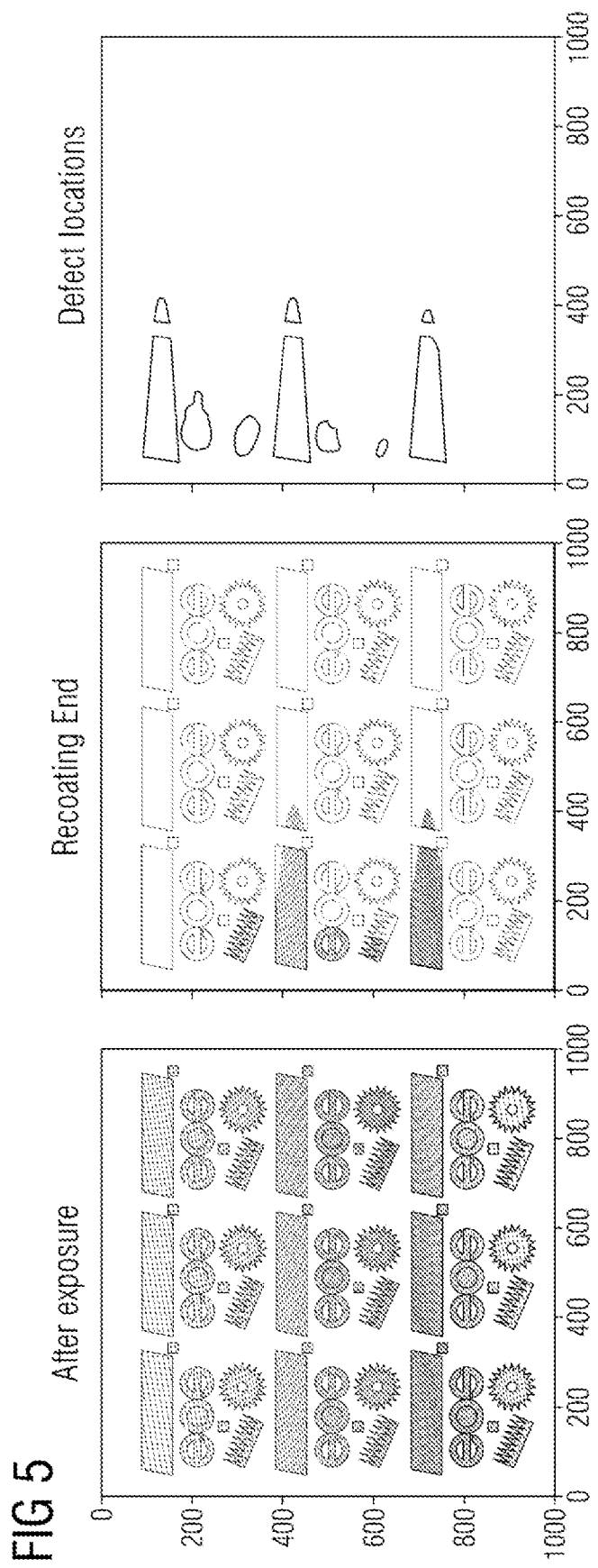
Figure 6:
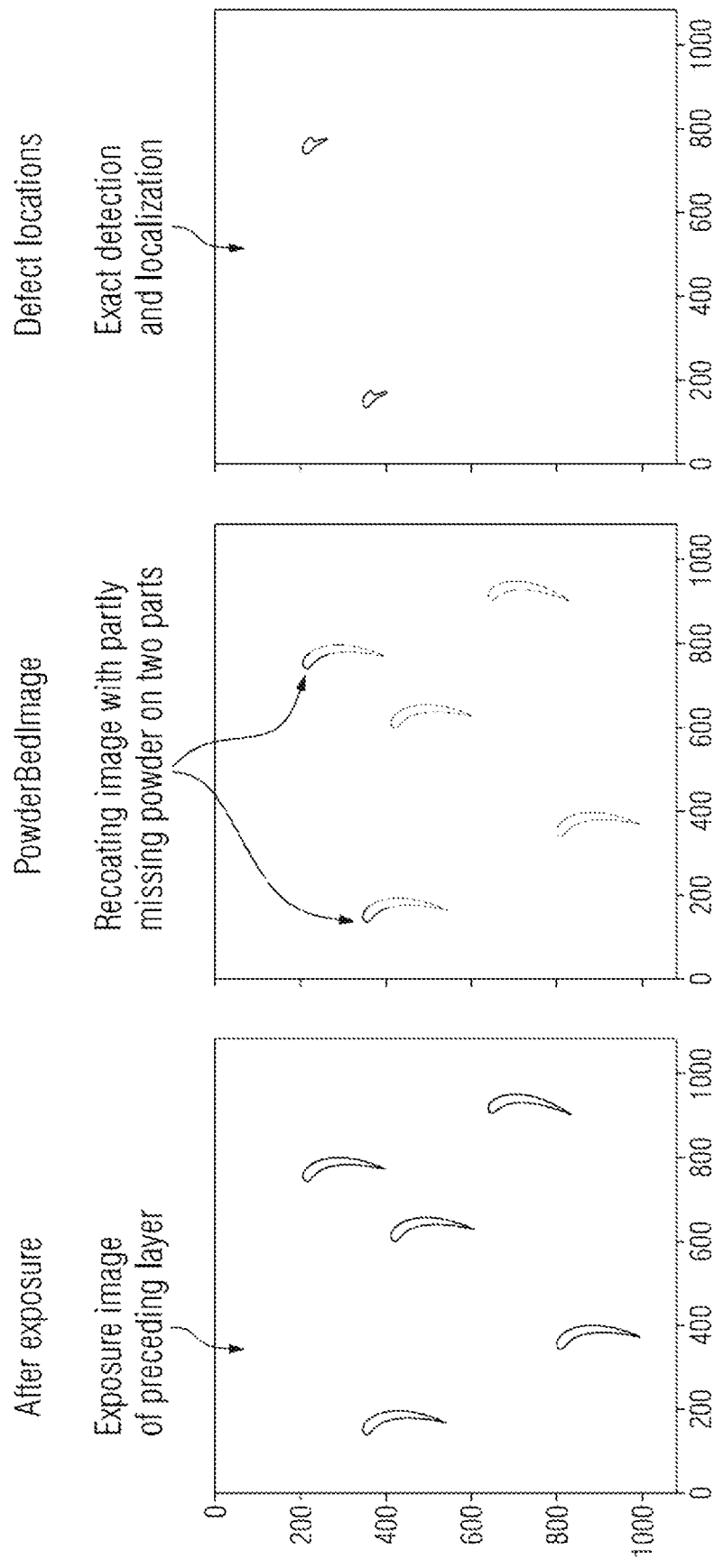

FIG. 4 schematically shows exemplary embodiments of the correlation and aggregation;

FIG. 5 shows a schematic representation of an example of flaw detection according to an exemplary embodiment of the invention, FIG. 6 shows a schematic representation of another example of flaw detection according to an exemplary embodiment of the invention.

DETAILED DESCRIPTION

Figure 1:
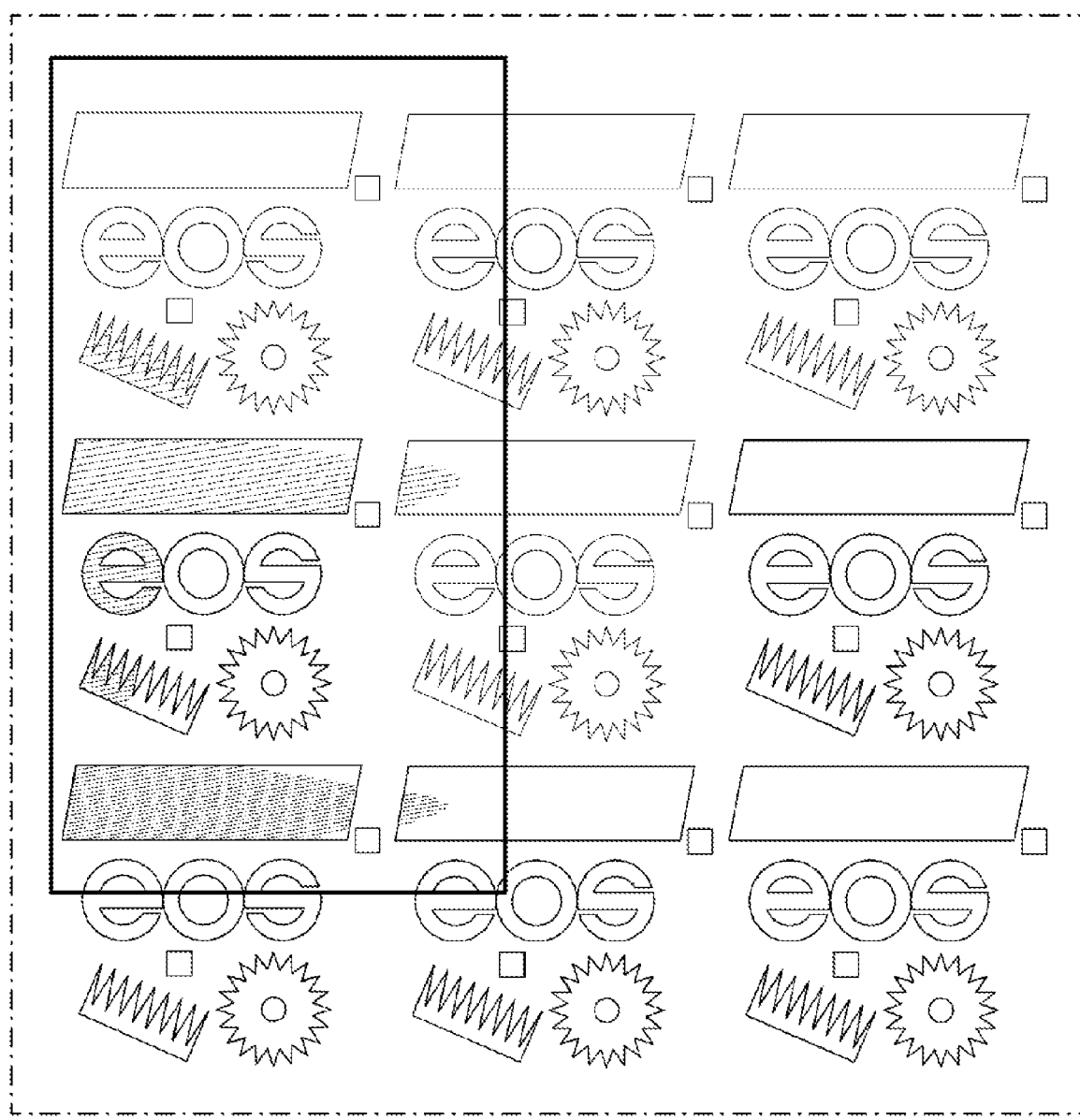
FIG. 1 shows an image of a layer containing multiple defects relating to missing powder, after a new coating according to the conventional art, which are marked by the yellow box.

FIG. 1 presents an image of the coating of a layer with powder, as occurs during 3D printing according to the conventional art, ("recoating image") in a layer containing multiple defects relating to missing powder ("powder missing defects"), which are marked by a frame, as shown according to the conventional art. It can be seen here that defects close to the upper left-hand corner are difficult to detect due to different degrees of reflection, which leads to a very low contrast in this region.

In the example of the photograph of a new coating with powder containing multiple absent powder missing defects that is shown in FIG. 1, it is evident that, due to the different degrees of reflection that can arise for the photograph depending on the distance and lighting for the image capture, the bare metal, that is to say the places where the powder is missing, is captured with very different grayscale values, which considerably hampers the detection of the defects in the low-contrast regions, such as in the upper half of the framed region in FIG. 1.

The variation in reflection and contrast between the layers arises as a result of different, generally rather random, angular shifts of the scan path during exposure, which are introduced intentionally in order to avoid parallel exposure lines, since otherwise this leads to problems such as overheating.

Figure 2:
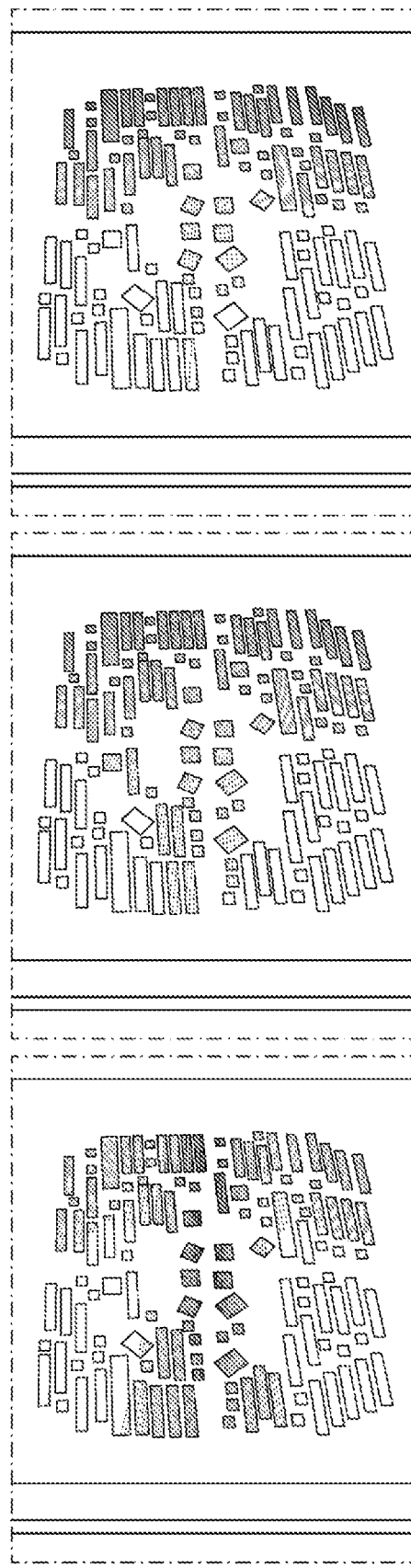
FIG. 2 shows images of layers as are produced after an exposure according to the conventional art.

These variations are shown by way of illustration in FIG. 2.

FIG. 2 shows images that are obtained after exposure. In the context of this disclosure, after exposure means that a laser has selectively melted the powder from the recoating.

Three successive layers in a 3D print can be seen here, which have been photographed according to the conventional art. Different grayscale values for the molten metal are shown here, both within each image and between the images.

The grayscale variation is caused primarily by differences in the light reflection and conveys no information about the process quality in general. However, it makes image analysis more difficult, since the molten regions can be represented by very different grayscale values, which sometimes cannot even be distinguished from grayscale values relating to the powder.

Figure 3:
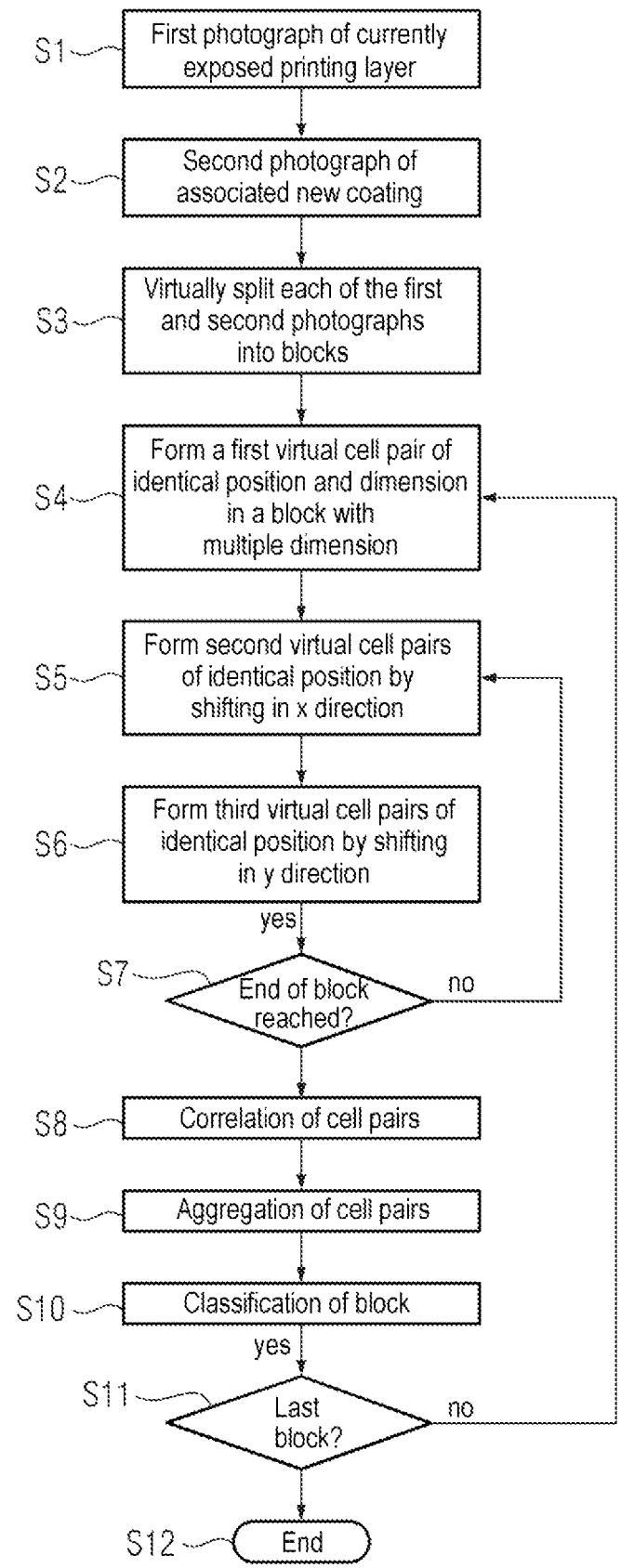
FIG. 3 shows a flowchart for an exemplary embodiment of the method.

FIG. 3 schematically shows a flowchart for an exemplary embodiment of the method according to the invention that confronts these challenges.

In the exemplary embodiment shown, a first step S1 comprises taking a first photograph of the currently fixed printing layer in the 3D printer. In this example, the layer of powder is achieved by the exposure by a laser. Embodiments of the invention are not limited to this, however. Rather, embodiments of the invention can also be applied to alternative methods of fixing, such as the method in which the powder is bonded by adhesive or is fixed by an electron beam.

This is followed in a second step S2 by a second photograph of the new coating that follows the exposure.

A first and a second digital photograph are therefore available: one before and one after coating with the powder. Each of these two photographs is then divided virtually into blocks in a third step S3.

For this example, the split can be provided here such that the whole area of each photograph is separated, in particular into frames covering identically dimensioned, for example successive, subareas of the area of the photograph—the blocks —, in such a way that they define a subarea of the photograph, for example for an association.

Furthermore, the split is provided for the two photographs identically, which means that an accordingly produced subarea of the first photograph has the same orientation, shape and dimension as the accordingly produced subarea of the second photograph.

In a fourth step S4, an identically dimensioned and positioned first cell is then formed at a starting position in each block for each photograph, that is to say for the first and second photographs. This is likewise virtually, as characterized in the manner described previously.

Proceeding from this fourth step S4, a fifth step S5 then comprises forming a second cell for each photograph: according to embodiments of the invention, these are not disjunct from the respective first cell for each photograph. They thus overlap the initial cell in each case. The second cells correspond here to the first cell in terms of dimension and shape, but are somewhat offset in the x direction in terms of position.

In a sixth step S6, on the basis of the first cell formed in the fourth step S4, a further cell pair is likewise formed for each photograph, that is to say one third cell per photograph. These are likewise identical to the first cell in terms of dimension and shape, but offset from the first cell in the y direction in terms of position. They thus likewise overlap the first cell.

The degree of overlap in the two offsets may be identical here, but is not limited to this.

In a seventh step S7, a check is now performed to ascertain whether, after the second cell pair has been formed, the first cell pair and the second cell pairs and third cell pairs have already reached the end of the block; the whole block has thus been covered virtually by a first cell pair and at least one second cell pair and at least one third cell pair. If this is not the case after this first offset, the fifth step S5, the sixth step S6 and the seventh step S7 are repeated, and so a further second and third cell pair are formed.

This continues until the result of the test in the seventh step S7 is that the block is covered.

In this example, the number of offset cells in the y direction is identical to that in the x direction. The example and embodiments of the invention are not limited to this. Different offset steps can take place in one and the other direction.

For the example shown, this means that, as one possible variant, there is the option of the extent of the offset in the x direction being able to be chosen differently than the extent in the y direction. However, a further variant also consists in the steps being able to be performed in a different order and/or in separate loops.

For the whole exemplary embodiment shown, it generally holds that the example and the invention are not tied to exactly this sequence of steps and type of method steps. On the contrary, any sequences, formations of subroutines and loops and combinations of individual instances of these steps and variations thereof are covered by embodiments of the invention within the limits defined by the claims and also within physical (causality) limits.

Thus, if the block is covered at least by one cell, an eighth step S8 can comprise performing a correlation according to embodiments of the invention for the cell pairs. In the illustration, this correlation is performed in a subroutine, and the sum total of the first cell pair and the second and third cell pairs is transferred to this subroutine. Embodiments of the invention are not limited to this implementation variant, however, but rather, as observed above, the structure of the implementation may be an entirely different one. By way of example, individual pairs could be transferred to the subroutine, or subroutines are not used, but rather alternative implementations are used to achieve correlation of the pairs in a different way.

Following this correlation in the eighth step S8, embodiments of the invention then involve an aggregation being performed over the sum total of the cell pairs in a ninth step S9.

Details regarding aggregation and correlation are specified on the basis of the schematic representation of an exemplary embodiment of these processes in FIG. 4.

Following completion of this aggregation, a classification of the block is then performed. This is represented as one step to simplify matters, but could also be implemented as a subroutine that is called with the results of the aggregation or, as outlined above, as totally different implementations for realizing embodiments of the invention's concept.

Since a block of a block pair—logically associated by the identical dimension, shape and position on the first and second photographs, analogously to the cell pairs—is a subarea of each of the photographs, it will more likely be the rule that a test for whether it was the last block, which is performed in an eleventh step S11, provides a negative result and therefore the steps from the fourth step S4 to the tenth step S10 are repeated.

If all of the blocks have now been classified and the result of the test in the eleventh step S11 is positive, then the examination of the two photographs has finished. This can then be followed by output of the result, indicating whether and/or which flaws occurred while the current layer was being printed. If applicable, a signal is output, printing is stopped and/or error handling capabilities are initiated.

To provide a better understanding of the exemplary embodiment according to the invention, the correlation and aggregation will be explained in more detail on the basis of the schematic representation thereof that is shown in FIG. 4.

The left-hand half shows the scheme of the correlation/aggregation applied to the photograph of the exposed layer.

The contribution by the exemplary embodiment to solving the problem on which the invention is based consists in a suitable correlation between at least two images, wherein, in order to detect missing powder, one image is taken after exposure and one is taken after recoating. In this case, embodiments of the invention's contribution to the solution is based on the inventive idea that, if the powder is missing, the local patterns in the recoating image have a high level of correlation with the exposure image in the regions in which the powder is missing.

This approach here sets itself apart from a test for pixel-by-pixel identity between the images because the test normally cannot work if there are slight brightness differences between the images and in particular both metal and powder can have very similar grayscale values locally, depending on reflection, that lead to incorrect results during comparisons.

With one exemplary embodiment of the invention, like that described in FIG. 3, the correlation as schematically shown in FIG. 4 has the following effect:

the correlation according to the exemplary embodiment of the invention requires sliding windows, the cells described previously, to be moved in sync over the images that are to be compared.

It is advantageous if cells are rather small, for example 3×3 pixels or 5×5 pixels in size, in order to be able to detect even small defects. The optimum cell size will be determined here on the basis of the spatial resolution of the digital camera and will then usually remain constantly set for a specific printer type, however. For each cell position, the Pearson correlation coefficient of the respective sample, that is to say the respective cell pair, is then calculated as follows:

$$r(c^a, c^b) = \frac{\sum k(p_k^a - m^a)(p_k^b - m^b)}{\sqrt{\sum k(p_k^a - m^a)^2 \sum k(p_k^b - m^b)^2}} \quad (1)$$

where ca, cb denote the same cell in the images a and b, pk denotes the pixel values of the cell, and m denotes the average pixel value of the cell.

The numerator in equation (1) measures the common variation in the pixel values of the cell pk around the respective cell mean m in the cell in both images. If the cell shows the same variation value in both images, that is to say a pixel is larger (or smaller) than the respective cell mean in both images, then the product term in the sum of the numerator is positive. It is negative for an opposite variation, for example the pixel value in the image a is larger than the cell mean, while the same pixel in b is smaller than the mean. The sum runs through all of the pixels of the cell here.

The denominator normalizes the sum by way of the product of the standard deviations of the cells.

The result of this step is a correlation coefficient value r $\in [-1, 1]$ for each cell.

Values close to +1 indicate here a high degree of correlation (similarity) for the respective cell in both images.

According to the exemplary embodiment of the invention, the aggregation schematically indicated by the larger rectangle in the two images of the figure now requires a threshold value to be applied to all correlation coefficients. By way of example, this can be used to set all values less than 0.9 to zero.

Next, resultant values are aggregated over adjacent cells. This is attained by defining sliding cells overlapping by one pixel, all of which, comprising 5 times 5 cells, thus produce a block indicated as a larger rectangle, the values of which are summed.

A high summed value per block at the end of this process indicates a defect relating to the missing powder in this block.

Alternatively or additionally, further criteria can also be included in the aggregation/correlation, for example a requirement that the local variance per cell at least exceeds a constant minimum value. This allows incorrect correlations to be avoided, which can arise for example on account of similar JPEG compression artefacts in the two images, which, although irrelevant with regard to powder flaws, can influence local correlations.

In a development of the exemplary embodiments to refine the detection, the results can be combined across successive layers or pairs of first and second photographs. This means that, for example, if the same block position in at least two successive layers exhibits high values, the result determined can be that the defect is serious, whereas blocks for which a defect occurs only in a single layer can be considered less serious.

FIG. 5 shows examples for application of the invention's exemplary embodiments relating to successful evidence of missing powder, which thus successfully demonstrate a flaw.

These each schematically show here the cycle of detection according to embodiments of the invention for different printed products. An identical aspect of the figures here is that the far left shows the layer after exposure, the middle shows the layer after coating with powder and the far right shows the detection result according to an exemplary embodiment of the invention, as would be able to be visualized, for example, in order to be shown to a user of the printer, or the person performing printing, on a display, for example. This display could be mounted on the printer itself and presentation could take place in situ, or it takes place at a different location, for example at the location where the print job was issued, which does not necessarily have to correspond to the site of the printer. By way of example, it is conceivable for this to be provided when single pieces, such as for example prototypes, are produced. Central printing services are frequently accessed here. Even and especially during a single job such as this, it is desirable to detect flawed prints accurately and early on.

In summary, advantages, details and variant embodiments can also be specified as follows.

An essential advantage provided by embodiments of the invention results from combining the correlation and aggregation schemes, such as those of the exemplary embodiments shown in FIG. 3.

The reason for this is particularly that the use of small cells for the correlation facilitates the detection of smaller defects. The small cells can also lead to high correlations in benign cases, however, that is to say in the absence of defects. This can arise for example when molten material of an exposed area protrudes partially from the powder, as a result of which it becomes partially visible in the new coating image.

As a result of embodiments of the invention's combination with the aggregation, more precisely as a result of the threshold formation and aggregation of the cell level correlations in the larger blocks, which are the correlations on a larger spatial area, these false alarms are eliminated, however.

The solution according to embodiments of the invention thus uses the described combination to afford a means for detecting powder missing defects, which is one of the most critical, that is robust and at the same time has a high level of sensitivity toward small defects.

The solution according to embodiments of the invention also produces fewer false alarms.

Embodiments of the invention also exhibit an invariance toward local brightness fluctuations, for example due to inhomogeneous lighting. In the case of the exemplary embodiment discussed in FIG. 3, this results from the local mean in equation (1) being subtracted per cell, with the result that brightness differences between the cells are irrelevant, since only the common variation around the respective mean counts.

The exemplary embodiments of the invention are also distinguished by easily interpretable and easily adaptable threshold values, since the correlation coefficients, in particular when stipulating the threshold value as 1, are delimited by 1, 0.

Embodiments of the invention are very well suited here to an implementation of fast architectures comprising popular CNN frameworks, such as for example what is known as "Tensorflow".

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A quality inspection method for three-dimensional printing, wherein a three-dimensional printing object is produced, wherein the printing object is divided virtually into layers and successive layers of the print model are gradually printed by the printer, wherein:
   a. this is accomplished by virtue of a new coating with a powder being provided for each layer according to the virtual layer that is to be printed;
   b. the new coating is fixed, wherein, for each layer;
   c. at least one first digital snapshot of the fixed layer is produced;
   d. at least one second digital snapshot of the new coating is produced;
   e. at least one virtual split for the first snapshot and at least one virtual split for the second snapshot are provided, wherein the first snapshot and the second snapshot are each divided into subareas, wherein all of the subareas cover the whole snapshot at least once per snapshot, and the first split is provided, wherein a subarea of the first snapshot corresponds to a subarea of the second snapshot in terms of position and dimension and the sum of the subarea of the first snapshot corresponds to the sum of the subarea of the second snapshot;
   f. a subarea of the first snapshot that is determined by identical position and identical dimension and a subarea of the second snapshot that is determined by the identical position and identical dimension are taken as a basis for performing an examination, wherein the subareas are subjected to correlation and aggregation;
   g. the correlation and aggregation is repeated at least for each pair of subareas of the first snapshot and of the second snapshot that is defined by identical position and identical dimension, the position of each further pair of subareas being shifted gradually in the x and/or y direction according to a Cartesian coordinate system;
   h. an error procedure is initiated if a defect at least on the current layer is signaled on the basis of at least one performed correlation and/or aggregation;
   i. the virtual split for the first snapshot and the virtual split for the second snapshot are provided, wherein first subareas are formed, which have a first dimension, and second subareas are formed, which have a second dimension, the second dimension being larger than the first;
   j. the correlation is performed, wherein a correlation coefficient is formed for each pair of first subareas that is situated within a pair of second subareas, the position of each further pair of subareas being shifted gradually in the x and/or y direction according to a Cartesian coordinate system;
   k. the aggregation is performed, wherein the sum of the correlation coefficients is formed for each second subarea over all first pairs of first subareas that are positioned within the second subarea; and
   l. at least a comparison of the sum with a first threshold value is taken as a basis for initiating the error procedure if the threshold value is exceeded.

2. The method as claimed in claim 1, wherein the correlation coefficient is formed as a so-called Pearson correlation coefficient.

3. The method as claimed in claim 1, wherein the Pearson correlation coefficient is formed on the basis of the formula $$r(c^a, c^b) = \frac{\sum k(p_k^a - m^a)(p_k^b - m^b)}{\sqrt{\sum k(p_k^a - m^a)^2 \sum k(p_k^b - m^b)^2}}$$

with
a=first snapshot,
b=second snapshot,
ca=first subarea of the first snapshot,
cb=first subarea of the second snapshot, pk=the individual pixel values of the respective first subarea,
m=the average pixel value of the respective first subarea,
k=running index for the pixel values pk of the respective first subarea
r ∈ [−1, 1] for each first subarea.

4. The method as claimed in claim 1, wherein before the aggregation the coefficient is normalized, wherein if a second threshold value is not reached then the coefficient is set to the value 0.

5. The method as claimed in claim 1, wherein a ratio of the first dimension to the second dimension is stipulated, wherein at least two first subareas overlap.

6. The method as claimed in claim 5, wherein the first dimension and the second dimension are defined by the number of pixels in the x and y directions according to a Cartesian coordinate system, and the ratio of the first dimension to the second dimension is stipulated, wherein at least two first subareas have an overlap for at least one pixel row.

7. The method as claimed in claim 6, wherein the ratio of the first dimension and second dimension defined by the number of pixels is stipulated in such optimized fashion that they take account of the resolution of a camera that produces the first and second snapshots and/or other parameters relating to the three-dimensional print.

8. The method as claimed in claim 1, wherein the examination is performed on the basis of subareas determined by at least a first pair comprising a first snapshot and a second snapshot and a second pair comprising a first snapshot and a second snapshot.

9. An arrangement for quality inspection for three-dimensional printing wherein a three-dimensional printing object is produced, wherein the printing object is divided virtually into layers and successive layers of the print model are gradually printed by the printer, wherein
   a. this is accomplished by virtue of a new coating with a powder being provided for each layer according to the virtual layer that is to be printed; and
   b. the new coating is fixed, characterized by means for carrying out the method as claimed in claim 1.

10. The method as claimed in claim 1, wherein the new coating is fixed using a laser, adhesive, or electron beam.

11. The method as claimed in claim 1, wherein the correlation and aggregation is machine-learning-assisted.

12. The method as claimed in claim 1, wherein the second threshold value is a value less than the value 0.9.

13. The method as claimed in claim 6, wherein the first dimension is defined by 3×3 pixels and the second dimension is defined by 5×5 subareas.

* * * * *